United States Patent
Foresti et al.

(10) Patent No.: US 12,113,412 B2
(45) Date of Patent: Oct. 8, 2024

(54) GEARS FOR ELECTRIC MOTOR

(71) Applicant: The Regents of the University of California, Oakland, CA (US)

(72) Inventors: Stefano Foresti, Denair, CA (US); Christopher Chalabi, Turlock, CA (US); Johnathan Deas, Santa Clarita, CA (US); Sonia Desaidamle, Merced, CA (US); Samuel Gottesfeld, Oxnard, CA (US); Blair Macleod, Agoura Hills, CA (US); Christopher Reps, Arroyo Grande, CA (US); Michiro Robinson, Sunland, CA (US)

(73) Assignee: The Regents of the University of California, Oakland, CA (US)

( * ) Notice: Subject to any disclaimer, the term of this patent is extended or adjusted under 35 U.S.C. 154(b) by 500 days.

(21) Appl. No.: 17/322,685

(22) Filed: May 17, 2021

(65) Prior Publication Data

US 2021/0273541 A1    Sep. 2, 2021

Related U.S. Application Data

(63) Continuation of application No. PCT/US2019/061881, filed on Nov. 15, 2019.
(Continued)

(51) Int. Cl.
*H02K 21/16* (2006.01)
*H02K 1/28* (2006.01)
(Continued)

(52) U.S. Cl.
CPC .............. *H02K 21/16* (2013.01); *H02K 1/28* (2013.01); *H02K 7/116* (2013.01); *H02K 16/00* (2013.01); *H02K 2213/03* (2013.01)

(58) Field of Classification Search
CPC .......... H02K 1/28; H02K 7/116; H02K 16/00; H02K 21/16; H02K 2213/03
(Continued)

(56) References Cited

U.S. PATENT DOCUMENTS 4,187,441 A * 2/1980 Oney ................ H02K 21/24
                                                      310/112
5,982,070 A * 11/1999 Caamano ............... H02K 1/185
                                                      310/43
(Continued)

FOREIGN PATENT DOCUMENTS

CN    105553202 A    5/2016
CN    105978268 A    9/2016
(Continued)

OTHER PUBLICATIONS

International Search Report and Written Opinion; dated Apr. 27, 2020; 11 pages; International Searching Authority, United States Patent & Trademark Office.

*Primary Examiner* — Rashad H Johnson
(74) *Attorney, Agent, or Firm* — Sherrie M. Flynn; Aisha O. Otori; Coleman & Horowitt LLP

(57) ABSTRACT

An electric motor with multiple electric gears to achieve an effect equivalent to mechanical gears in transmissions, enabling more efficient use of electricity at a wider range of speeds and torques is described. The Gears for Electric Motor (GEM) comprises a multi-phase motor having a concentric set of dedicated rotors to specific ranges of revolutions per minute (RPMs), and corresponding stators. The rotors and stators may be fitted within each other or positioned approximately parallel to each other along the longitudinal axis of the motor shaft. A controller determines which rotors are activated based on desired efficiency, torque and speed. Alternately, or in addition, magnets and coil pairs are constructed with varying properties to make more efficient use of electricity at a wider range of speeds and torques.

20 Claims, 13 Drawing Sheets

Related U.S. Application Data

(60) Provisional application No. 62/768,496, filed on Nov. 16, 2018.

(51) Int. Cl.
 *H02K 7/116* (2006.01)
 *H02K 16/00* (2006.01)

(58) Field of Classification Search
 USPC .......................................... 310/89, 112–114
 See application file for complete search history.

(56) References Cited

U.S. PATENT DOCUMENTS

| | | | |
|---|---|---|---|
| 6,639,337 B1* | 10/2003 | Nakano | H02K 17/02 |
| | | | 310/113 |
| 8,188,633 B2* | 5/2012 | Quere | H02K 16/00 |
| | | | 310/112 |
| 8,446,060 B1* | 5/2013 | Lugg | F02C 3/113 |
| | | | 310/156.22 |
| 8,987,962 B2 | 3/2015 | Kim | |
| 9,509,198 B2 | 11/2016 | Jahshan | |
| 2008/0024044 A1* | 1/2008 | Palmer | H02K 99/20 |
| | | | 310/68 R |
| 2009/0309442 A1* | 12/2009 | Qu | H02K 21/24 |
| | | | 310/156.48 |
| 2010/0139999 A1 | 6/2010 | Park | |
| 2010/0171451 A1* | 7/2010 | Quere | H02K 16/00 |
| | | | 310/156.01 |
| 2012/0286616 A1* | 11/2012 | Li | H02K 21/029 |
| | | | 310/191 |
| 2016/0087517 A1* | 3/2016 | Powell | H02K 7/1823 |
| | | | 310/103 |
| 2018/0062490 A1* | 3/2018 | Knight | H02K 17/32 |
| 2019/0393765 A1* | 12/2019 | Holcomb | H02K 11/0094 |
| 2021/0273541 A1* | 9/2021 | Foresti | H02K 16/00 |

FOREIGN PATENT DOCUMENTS

| | | |
|---|---|---|
| CN | 108667248 A | 10/2018 |
| JP | 2012-244767 A | 12/2012 |

* cited by examiner

GEARS FOR ELECTRIC MOTOR

CROSS-REFERENCE TO RELATED APPLICATION

This application claims priority to and is a continuation application of PCT/US2019/061881 filed Nov. 15, 2019, which claims priority pursuant to 35 U.S.C. § 119(e) to U.S. provisional application Ser. No. 62/768,496, filed Nov. 16, 2018. The text and contents of each of these patent applications are specifically incorporated herein, in their entireties, by reference.

FIELD OF THE INVENTION

The present invention relates to the field of electric motors. More specifically, the invention relates to electric motors with multiple "gears" (rotor/stator combinations) and/or multiple types of coils and/or magnets enabling efficient use of electricity at a wide range of speeds and torques.

DISCUSSION OF THE BACKGROUND

The increase in vehicle emissions and awareness in global warming has prompted the population to look for greener ways to travel. The electric car complies with new green standards, and as such, electric cars are becoming the way of the future. The electric motor driving the vehicle is the core component.

In a traditional electric motor, there is one stator and one rotor that are responsible for all accelerations and speeds. The rotor (permanent magnet) is concentric with the stator. The stators coils are excited by running a current through the coils, which produces a magnetic field. When the coils are individually energized in a certain alternating sequence, the changing magnetic field causes the permanent magnet to align itself with the energized coils, causing the rotor to rotate. The rotor is usually attached to a drive shaft or some other mechanism that requires rotation.

There are two basic models of electric motors used in industry, an "outrunner" motor and an "inrunner" motor. The outrunner motor 100 of FIG. 1, is designed with the stator 110 located inside of the rotor 120. Conversely, the inrunner motor 200 of FIG. 2, has the rotor 220 inside the stator 210. The inrunner motor 200 takes the outrunner motor 100 and flips it inside out, meaning that the rotor 220 is located on the inside of the motor 200, and the stator 210 houses the rotor 220 and acts as an electromagnet. Like the multiple sets of coils 112 of the outrunner motor 100, the inrunner motor 200 typically has multiple sets of coils 212 that are energized when a changing current runs through them. A magnetic field is induced and the rotor 220 will be attracted to the induced magnetic field, similarly to the rotor 120 of outrunner motor 100.

What both of these designs have in common is that they each can only output one torque value. This is disadvantageous because for a certain speed at which the motor is operating, a torque that is too great can result in wasted energy, while a torque that is too small will not achieve the desired speed. There is only a small range of speed in which a given torque delivers maximum efficiency.

Improving overall motor efficiency over a wide range of speeds would reduce strain on battery technologies. The common battery chemistry used in electric vehicles is the lithium ion battery, which holds approximately 0.87 MJ/kg. In contrast, gasoline has a much higher energy density of 46.4 MJ/kg. In addition, high discharge rates can magnify some of the limitations of the lithium ion technology, such as reducing the number of charge cycles and wasting energy due to internal resistances.

Thus, one of the aims of the instant invention is a motor and motor control system that optimizes battery service life and efficiency by closely monitoring and controlling the current output of the battery. While adding a mechanical transmission could alleviate these issues, the increased torque of brushless direct current (BLDC) motors would require a more rugged transmission design in comparison to gasoline engine counterparts.

It can be seen in the diagram in FIG. 3 that while a typical electric motor can run relatively efficiently, the range in which it can run efficiently is relatively small. One of the goals of motor design of the instant invention is to expand that region of efficiency. One way to achieve higher efficiencies in an electric motor is to allow a motor to "shift" into a gear that would be more optimized for a given velocity.

Electric vehicles have been typically designed with a one-speed electric motor without the use of a mechanical transmission having multiple speeds and a clutch, because, unlike motors with a combustion engine, electric motors can deliver power by delivering enough current to enable the desired acceleration starting from zero motor RPM or zero vehicle velocity (from the motor being off). On the other hand, combustion engines need to have minimum RPMs with non-zero torque to deliver enough power for the desired acceleration, and need a clutch to prevent choking or wheel spinning when power is needed.

Transmissions with multiple gears are used to allow a combustion engine to operate in its most efficient region. Having multiple gears in an electric motor would also allow an electric motor to operate more efficiently. The bigger the motor, the more speed range with a given gear ratio, the more energy used for the same performance. Mechanical components like a transmission with gears and a clutch designed for combustion engines, however, are not readily applicable to electric motors, given the different torque-velocity ranges. By using a one-speed electric motor, manufacturers can avoid adaptations or redesign of transmissions or other drive train components. The tradeoff, however, is the reduced efficiency of conventional electric motors.

The typical one-speed electric motor, when applied to an electric vehicle has the advantage of simplicity, but also has the following limitations: (1) from a performance point of view, acceleration is very high at low speed but very low at high speed; and (2) from an efficiency point of view, travelling at highway speeds is very inefficient, even at constant speed, thus reducing the potential range of travel when it is most needed.

Thus, it is desirable to provide a motor that can achieve a more efficient use of electricity at a wider range of speeds and torques, thereby optimizing battery efficiency and service life.

SUMMARY OF THE INVENTION

The present invention advantageously provides multiple gears in an electric motor to achieve an effect at least equivalent to mechanical gears in transmissions, enabling more efficient use of electricity at a wider range of speeds and torques. The basic concept of this invention is a multi-phase motor, having a concentric set of rotors dedicated to specific ranges of revolutions per minute (RPMs), and corresponding stators.

Embodiments of the electric motor design of the instant invention use multiple (e.g., two, three, four or more) armatures with magnet-coil pairs aligned concentrically. The concentric alignments of the magnet-coil pairs may be positioned along the longitudinal axis of a motor shaft (roughly parallel to each other), or fitted within each other. Rotors can be activated individually or in any combination with each other. Multiple sized rotors expand the power band, so the motor can be operated at a wider range of RPMs, in addition to utilization of up-to-date voltage and current control methods to achieve increased efficiency. A smart controller determines which rotor(s) are activated based on desired efficiency, torque, speed, etc.

An embodiment of the gears for electric motor (GEM) invention takes advantage of the two motor technologies (inrunner and outrunner), combining the geometries of both the traditional inrunner and outrunner designs, and stacking multiple magnet/coil sets in order to create multiple "gears" that deliver an optimal torque for a given speed, and the desired speed or acceleration.

In another embodiment, magnets and coils pairs with varying properties are constructed to make more efficient use of electricity at a wider range of speeds and torques.

The GEM motor consists of at least two parts that distinguish it from traditional brushless motors:

Multiple gear pairs are achieved with multiple rotors-stators (magnet-coil pairs), or a plurality of coil-magnet properties; and A controller determines the current provided to the various stator stacks and coils based on desired velocity and acceleration, and feedback from the motor.

Thus, it is an object of the invention to achieve the equivalent of mechanical gears in transmissions of gas-driven engines with multiple concentric rotor-stator pairs in electric motors.

It is also an object of the invention to increase the efficient use of electricity in an electric motor at wider ranges of speed and torques.

It is also an object of the invention to expand the power band of an electric motor by operating the motor and a wider range of RPM's.

It is a further object of the invention to deliver optimal torque for a given speed or acceleration.

It is a further object of the invention to reduce the size and/or capacity of the battery needed for an electric motor.

It is a further object of the invention to optimize battery service life.

If is a further object of the invention to optimize battery efficiency.

It is to be understood that both the foregoing general description and the following detailed description are exemplary, but not restrictive, of the invention. A more complete understanding of the GEM invention disclosed herein will be afforded to those skilled in the art.

DETAILED DESCRIPTION OF THE PREFERRED EMBODIMENTS

Figure 1:
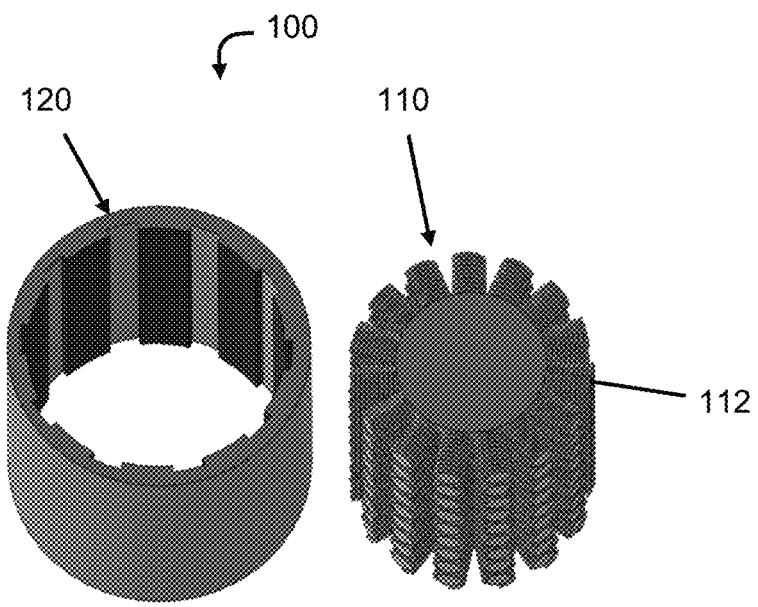
FIG. 1 shows a typical outrunner motor of the prior art.
Figure 2:
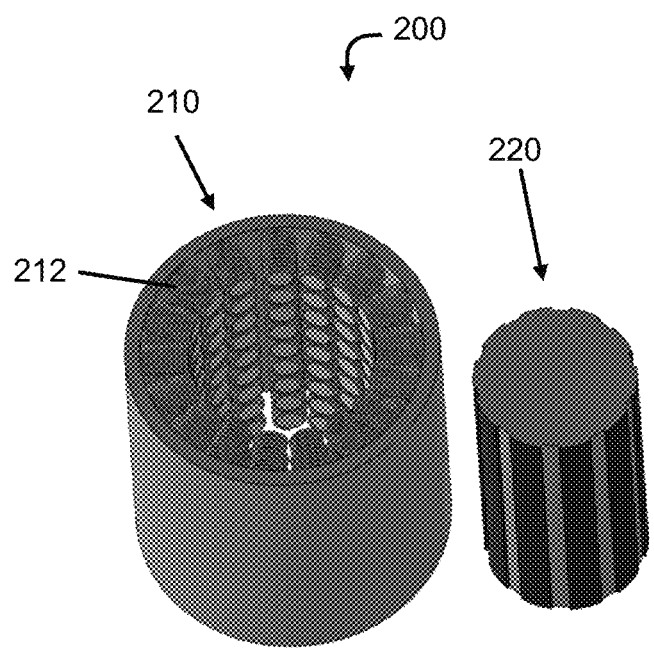
FIG. 2 shows a typical inrunner motor of the prior art.
Figure 3:
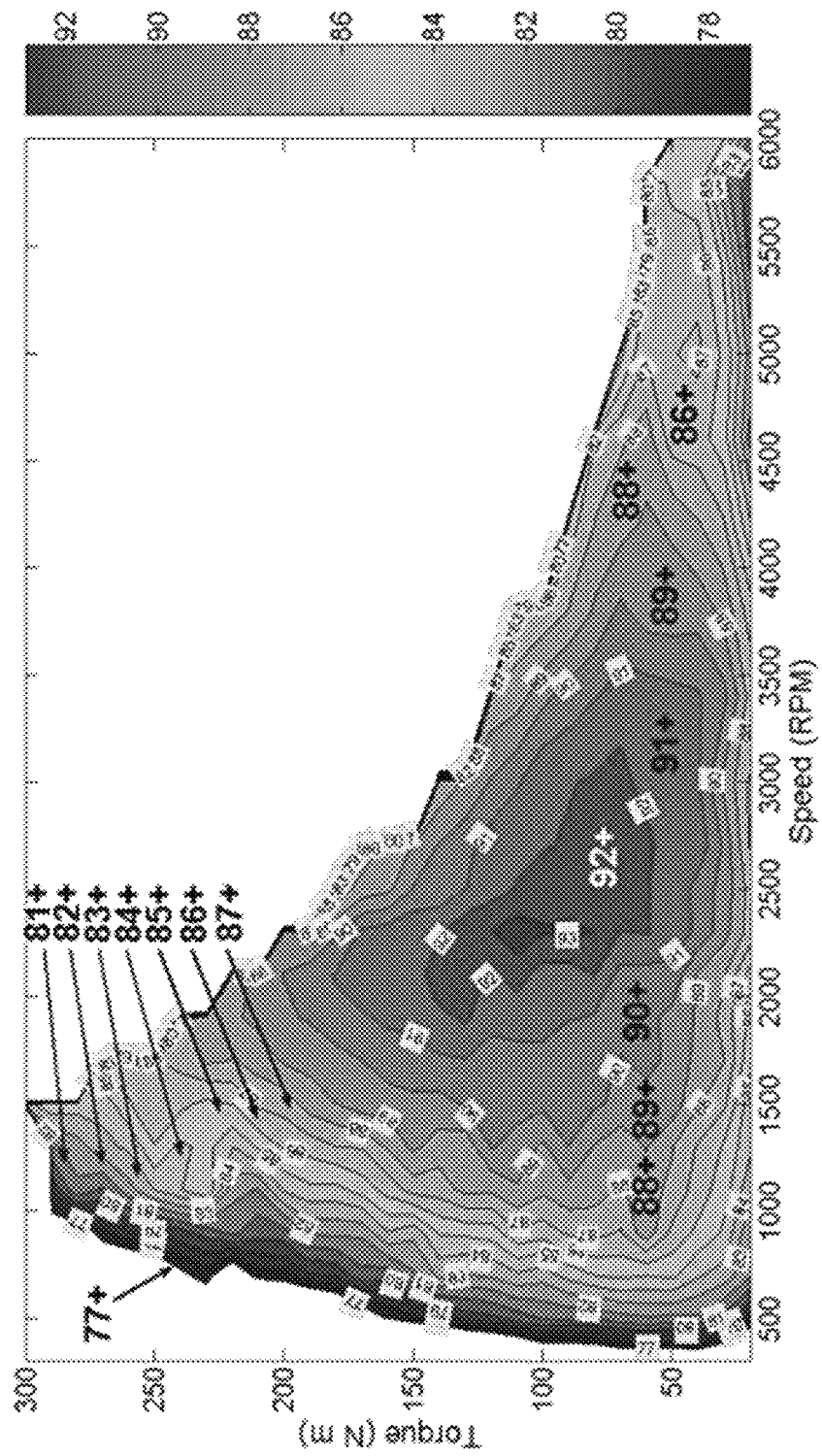
FIG. 3 shows the efficiency of conventional electric motors as a function of speed and torque.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention. Furthermore, in the following detailed description of the present invention, numerous specific details are set forth in order to provide a thorough understanding of the present invention. However, it will readily be apparent to one skilled in the art that the present invention may be practiced without these specific details.

In other instances, well-known methods, procedures and components have not been described in detail so as not to unnecessarily obscure aspects of the present invention. These conventions are intended to make this document more easily understood by those practicing or improving on the inventions, and it should be appreciated that the level of detail provided should not be interpreted as an indication as to whether such instances, methods, procedures or components are known in the art, novel, or obvious.

Combined Inrunner/Outrunner Gears for Electric Motor

In certain embodiments, the electric motor with multiple gears comprises multiple stators and rotors. In the discussion that follows, the electric motor with multiple gears is often described as having either two or three gears, in which each rotor-stator pair may be optimized for a certain revolutions per minute (RPM) and torque. However, the description should not be construed to limit the invention to just two or three gears. Instead, other numbers of gears are possible (e.g., 4, 5, 6, etc.).

In an embodiment, an electric motor having multiple gears generally comprises (i) a motor shaft, (ii) a rotor assembly having a plurality of concentric rotors operably attached to the motor shaft, each concentric rotor having at least one magnet, (iii) a stator assembly comprising a plurality of concentric stators, each concentric stator having at least one pair of stator coils, wherein a radius of a first concentric stator is different that a radius of second concentric stator, and (iv) a controller that allocates electrical current to the at least one pair of stator coils, thereby causing rotation of the motor shaft.

The electric motor having multiple gears may, in some embodiments, be a combination of inrunner and outrunner rotors/stators. In such embodiments, each inrunner rotor has a corresponding inrunner stator, and each outrunner rotor has a corresponding outrunner stator. In some embodiments, adjacent rotors and their corresponding stators may alternate between inrunner and outrunner. Alternatively, adjacent rotors and their corresponding stators may both be inrunner, or may both be outrunner. The electric motor having multiple gears may comprise any combination of inrunner rotors/stators and outrunner rotors/stators in any order and with any number of inrunner and outrunner rotors/stators.

Figure 4:
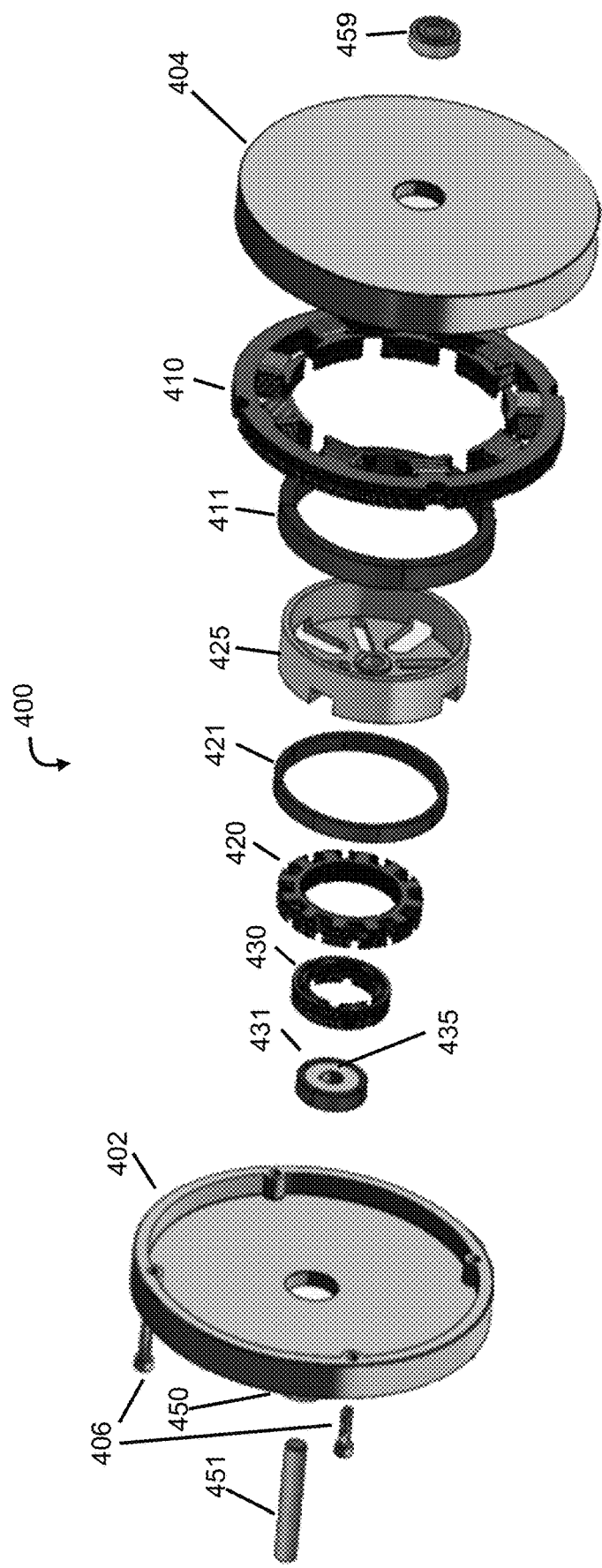
FIG. 4 is an exploded view of the components of an electric motor with three gears according to an embodiment of the invention.

FIG. 4 shows an exploded view of one embodiment of an electric motor 400 having multiple gears. The embodiment of FIG. 4 includes three gears, alternating inrunner, outrunner, inrunner. Although FIG. 4 shows three gears and alternating combinations of inrunner and outrunner rotor/stators, as explained above, any number of gears are possible as is any number of inrunner/outrunner combinations. In addition, the multiple gears do not have to alternate between inrunner and outrunner, but may be in any order.

In FIG. 4, motor housing cap 402 is attached and/or connected with screws 406 (or other conventional means of attachment) to housing body 404. The left bearing 450, is operably connected to the motor housing cap 402 (e.g., by press fit, set screw, pin, or other conventional means), and right bearing 459, is operably connected to the motor housing body 404 (by the same or similar means as bearing 450). The bearings 450 and 459 enable the motor shaft 451 to rotate internally of the housing body 404 and motor cap 402. The motor shaft 451 rotates with the rotors 431, 421 and 411.

In the embodiment of FIG. 4, the electric motor with three gears comprises an inrunner high RPM rotor 431 (high gear), an outrunner medium RPM rotor 421 (medium gear), and an inrunner low RPM rotor 411 (low gear). The inrunner high RPM rotor 431 corresponds to an inrunner stator stack 430, the outrunner medium RPM rotor 421 corresponds to an outrunner stator stack 420, and the inrunner low RPM rotor 411 corresponds to an inrunner stator stack 410.

From left to right in FIG. 4, high RPM rotor hub 435 is operably connected to the shaft 451 (by conventional means), and holds the high RPM inrunner rotor 431, which corresponds to the high RPM inrunner stator stack assembly 430. Next in line is the medium RPM outrunner stator stack assembly 420, which is concentric with and connected to the high RPM inrunner stator stack assembly 430, and corresponds to the medium outrunner rotor 421. Medium RPM rotor hub 425 is connected to the shaft 451 and holds the medium outrunner rotor poles 421 to an internal surface of the rotor hub 425. Next in line is the low RPM inrunner rotor 411 (low gear) that are held on the outer part of the cylinder surface of the medium RPM rotor hub 425. Low RPM inrunner stator stack assembly (low gear) 410 corresponds to the low RPM inrunner rotor 411. The motor housing body 404 holds all the multi-gear stator assemblies 410, 420, and 430, and is closed by the motor housing cap 402 with the screws 406.

As can be seen in the embodiment of FIG. 4, the radius of inrunner rotor 431 is smaller than the radius of outrunner rotor 421, which is smaller than the radius of inrunner rotor 411. Thus, the highest RPM rotor will have the smallest radius, and the lowest RPM rotor will have the largest radius. Generally, the radius of a rotor will increase as the RPM for the rotor decreases. Likewise, the radius of the corresponding stator stack for the highest RPM rotor have the smallest radius, the corresponding stator stack for the lowest RPM rotor will have the largest radius, and generally, the radius of the stator stack will increase as its corresponding rotor RPM decreases.

The motor design of this invention allows a magnet-coil (rotor/stator) pair of a larger radius ("lower gear" or "lower RPM") to be active when the vehicle, or other driven component, requires lower speeds or higher torque, and a magnet-coil pair of a smaller radius ("higher gear" or "higher RPM") to be activated when a higher speed or lower torque is required. This arrangement allows the lower gear to be optimized for low RPM and high torque, and the higher gear to be optimized for high RPM and low torque, thereby increasing the efficiency of the motor in a variety of load/speed conditions, as well as increasing performance (maximum speed, and acceleration at higher speeds) for given a vehicle/load.

Figure 5:
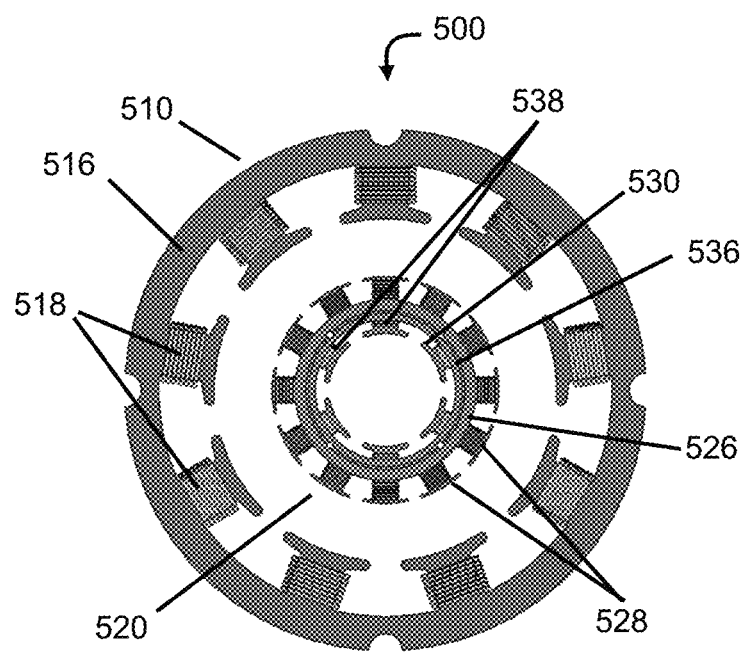
FIG. 5 shows a stator assembly of an electric motor with three gears, according to an embodiment of the invention.
Figure 6:
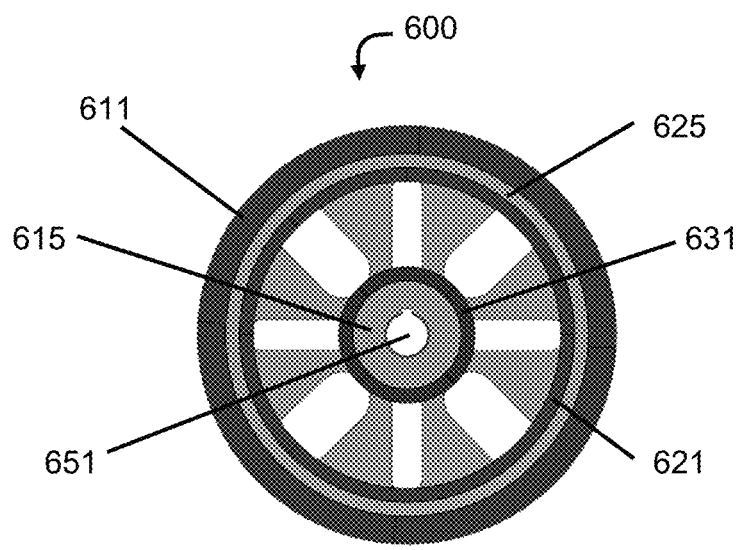
FIG. 6 shows a rotor assembly of an electric motor with three gears, according to an embodiment of the invention.

Referring now to FIGS. 5 and 6, a three gear embodiment of the GEM invention is shown. Generally, the GEM motor of FIGS. 5 and 6 comprises (i) a motor shaft (see motor shaft 651 of FIG. 6), (ii) a stator assembly (see stator assembly 500 of FIG. 5); and (iii) a rotor assembly (see rotor assembly 600 of FIG. 6).

The stator assembly 500 of FIG. 5 comprises multi-level (concentric) stators 510, 520, and 530 having a plurality of coils, respectively coils 518, 528 and 538. The coils 518 are connected by support material 516, the coils 528 are connected by support material 526, and the coils 538 are connected by support material 536. The support material may be any non-conducting (insulating) material such as plastic (e.g. PVC, polypropylene, PTFE, PEEK, etc.), fiber reinforced plastic, rubber (silicone rubber, EPDM, etc.), composite polymers, ceramic, etc. A controller (not shown)

allocates electrical current to one or more of coils 518, 528 and 538 of the stator assembly 500, which in conjunction with the permanent magnets 611, 621 and 631 of the rotor assembly 600 of FIG. 6 cause rotation of the motor shaft 651.

The rotor assembly 600 of FIG. 6 comprises three rotors (permanent magnets) 611, 621 and 631, which are fitted within each other and operably connected to the drive shaft 651 by two concentric pieces 615 and 625. The rotors 611, 621 and 631, the concentric pieces 615 and 625 and drive shaft 651 together make up the one-piece rotor assembly 600. Concentric pieces 615 and 625 comprise support material (see e.g., materials listed above for support material 516, 526 and 536), and insulation between the rotors 611, 621 and 631. The insulation separates the magnetic field of one rotor from the other rotors. In some embodiments, one or more layers of lamination may also be placed around the areas where the rotors 611, 621 and 631 are attached to the concentric pieces 615 and 625.

Rotors 611, 621 and 631 of the rotor assembly 600 are poles of respectively, the low RPM, medium RPM and high RPM gears, which will be attracted to the electrically excited coils of, respectively, stators 510, 520, and 530, thereby causing rotation of the motor shaft 651.

As can be seen from the FIGS. 5 and 6, the stator 510 is an inrunner stator that corresponds to the inrunner rotor 611, stator 520 is an outrunner stator that corresponds to outrunner rotor 621, and stator 530 is an inrunner stator that corresponds to inrunner rotor 631. Starting from the inside to the outside of FIG. 6, inrunner rotor 631 has the smallest radius of the rotors 611, 621 and 631 and corresponds to the high RPM, low torque gear. Outrunner rotor 621 is next in line and has a radius larger than the radius of rotor 631 but smaller than the radius of rotor 611 and corresponds to the medium RPM, medium torque gear. Inrunner rotor 611 has the largest radius of rotors 611, 621 and 631 and corresponds to the low RPM, high torque gear.

Alternate embodiments of the invention comprise constructing a motor with an outrunner rotor as the smallest radius, highest RPM rotor, whereby the outrunner stator and coils are the innermost part of the motor, with the outrunner rotor rotating outside of it, an inrunner rotor and inrunner stator as the medium radius, medium RPM rotor, and a outrunner stator and outrunner rotor as the largest radius, lowest RPM rotor. Additional embodiments include multiple concentric gears and combination of outrunner or inrunner in any number and order. Further embodiments of the invention include four or more gears, with rotor/stator pairs built concentrically utilizing the same principles described above.

Figure 7:
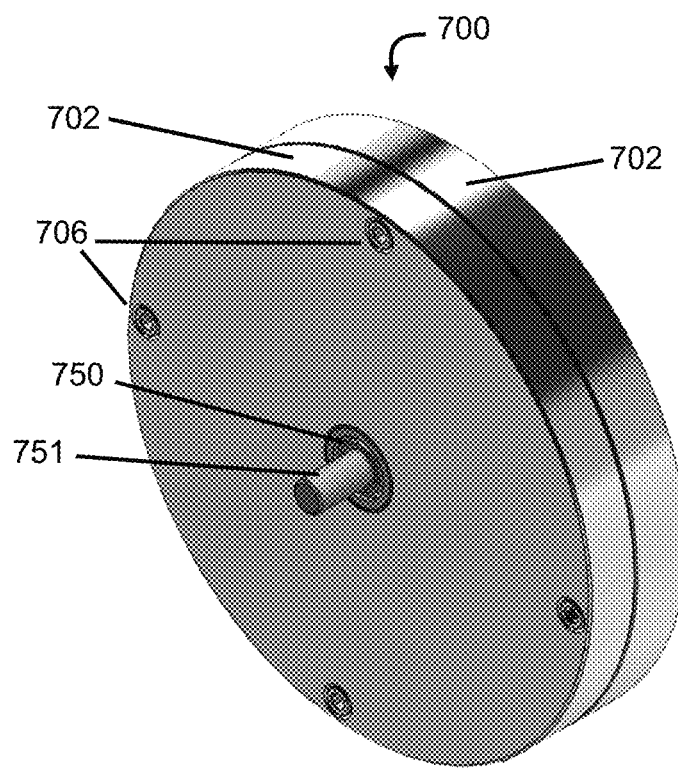
FIG. 7 is a perspective view of the outside of an assembled electric motor with a multiple gears fitted within each other, according to an embodiment of the invention.

FIG. 7 shows an outside assembled view of an electric motor 700 having multiple gears comprising motor housing caps 702 held together by screws 706. The motor shaft 751 and ball bearing 750, which allows the shaft to rotate within the housing is also shown. The motor housing caps 702 are configured to house multiple magnet-coil pairs that are fitted within each other. In alternate embodiments, multiple magnet-coil pairs may be positioned approximately parallel to each other along the longitudinal axis of the motor shaft (see e.g., magnet-coil pairs 1401 and 1402 of FIG. 14).

Figure 8:
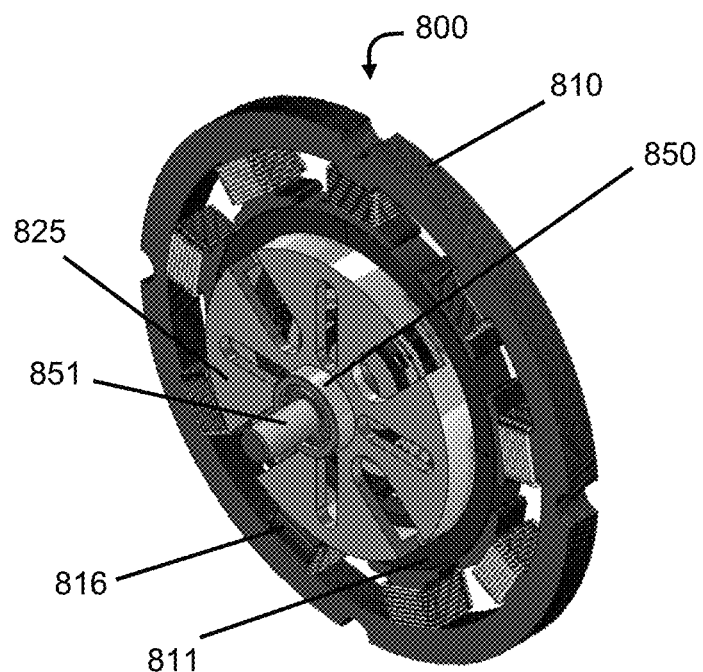
FIG. 8 is a perspective view of internal assembled components of an electric motor with multiple gears, according to an embodiment of the invention.
Figure 9:
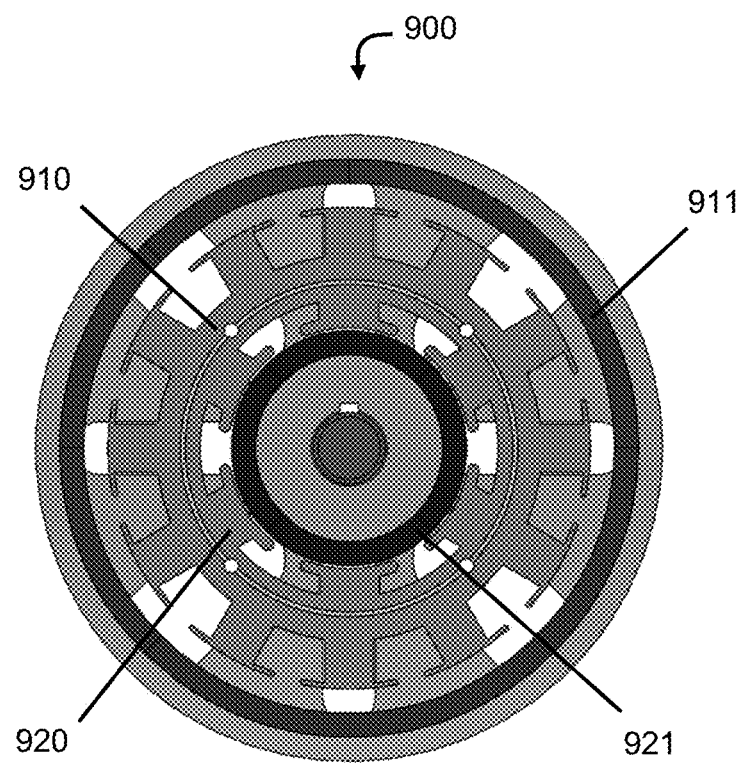
FIG. 9 is a front view of internal assembled components of an electrical motor with two gears, a high RPM inrunner stator and inrunner rotor, and a low RPM outrunner stator and outrunner rotor, according to an embodiment of the invention.

FIG. 8 shows the internal assembled components 800 of an electric motor with multiple gears comprising motor shaft 851, ball bearing 850, multi-level stator 810, support material 816 for multi-level stator 810, rotor (permanent magnet) 811 and concentric piece 825. Concentric piece 825 operably attaches inrunner rotor 811 to the motor shaft 851. FIG. 8 likewise represents an embodiment where magnet-coil pairs are fitted within each other.

FIGS. 9-12 show front views of different embodiments of an electric motor having a high gear and a low gear. The electric motor 900 of FIG. 9 comprises a high RPM inrunner stator stack 920, which corresponds to the inrunner poles of the high RPM rotor 921. The low RPM stator stack 910 is an outrunner stack, which corresponds to outrunner poles of the low RPM rotor 911.

Figure 10:
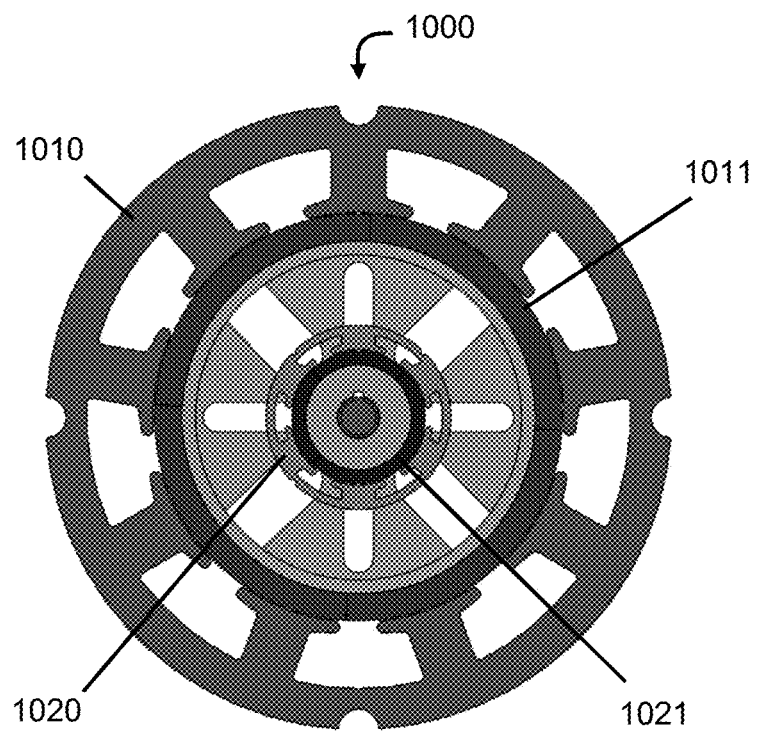
FIG. 10 is a front view of internal assembled components of an electric motor with two gears, a high RPM inrunner stator and inrunner rotor, and a low RPM inrunner stator and inrunner rotor, according to an embodiment of the invention.

The electric motor 1000 of FIG. 10 comprises a high RPM inrunner stator stack 1020, which corresponds to the inrunner poles of the high RPM rotor 1021. The low RPM stator stack 1010 is an inrunner stack and corresponds to inrunner poles of the low RPM rotor 1011.

Figure 11:
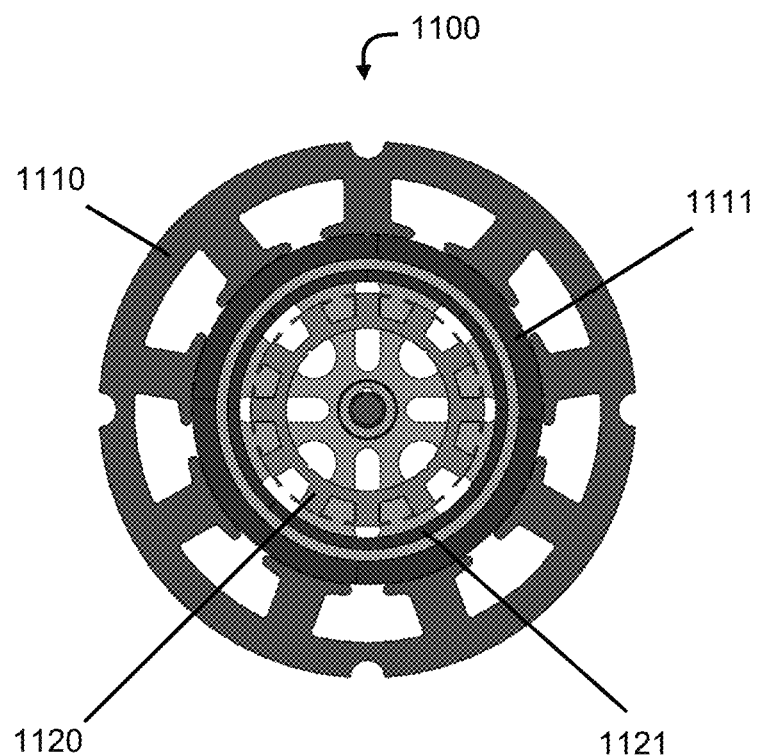
FIG. 11 is a front view of internal assembled components of an electric motor with two gears, a high RPM outrunner stator and outrunner rotor, and a low RPM inrunner stator and inrunner rotor, according to an embodiment of the invention.

The electric motor 1100 of FIG. 11 comprises a high RPM outrunner stator stack 1120, which corresponds to outrunner poles of the high RPM rotor 1121. The low RPM stator stack 1110 is an inrunner stack, which corresponds to inrunner poles of the low RPM rotor 1111.

Figure 12:
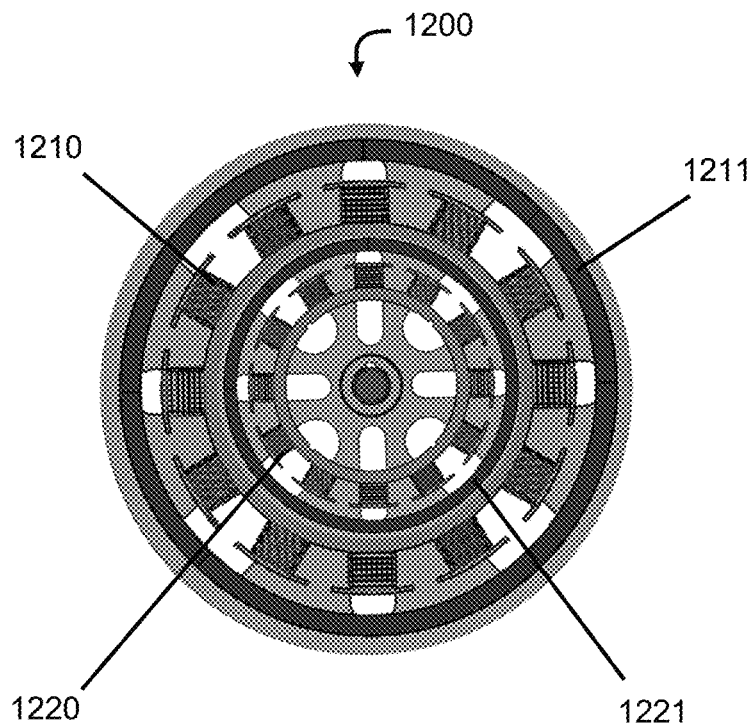
FIG. 12 is a front view of internal assembled components of an electric motor with two gears, a high RPM outrunner stator and outrunner rotor, and a low RPM outrunner stator and outrunner rotor, according to an embodiment of the invention.

The electric motor 1200 of FIG. 12 comprises a high RPM outrunner stator stack 1220, which corresponds to outrunner poles of the high RPM rotor 1221. The low RPM stator stack 1210 is an outrunner stack and corresponds to outrunner poles of the low RPM rotor 1211.

Additionally, in some embodiments, a multi-gear motor can be constructed with magnet/coil pairs that are:
 Fitted within each other on the motor shaft; and/or
 On positioned parallel along the longitudinal axis of the motor shaft.
These different embodiments are shown in FIGS. 13 and 14.

Figure 13:
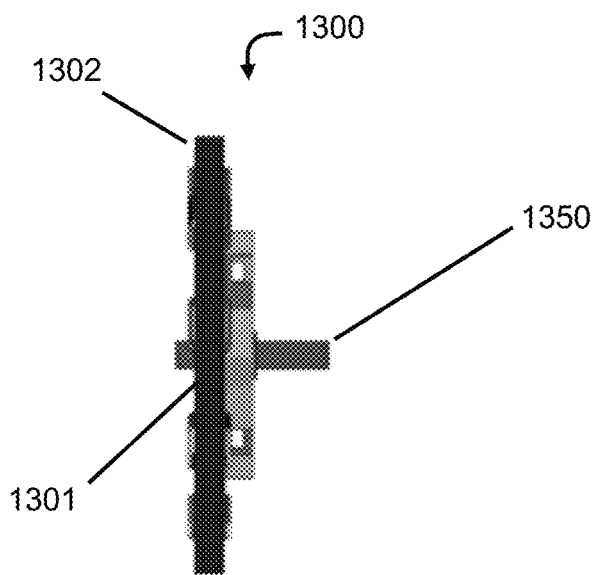
FIG. 13 is a side view of a high RPM magnet-coil pair and a low RPM magnet coil pair fitted within each other, according to an embodiment of the invention.
Figure 14:
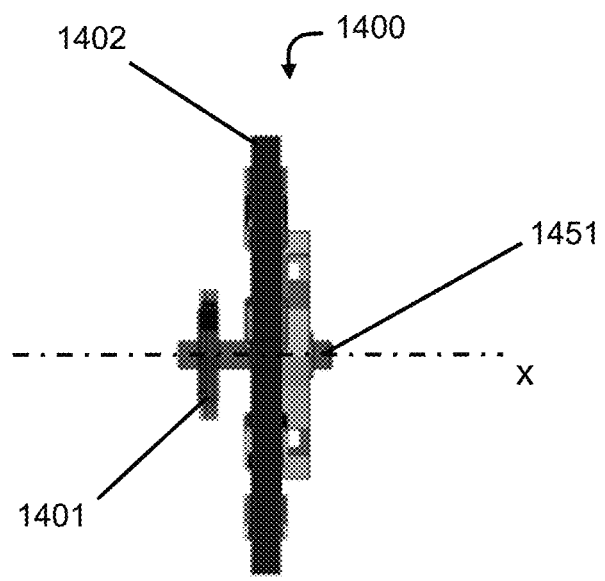
FIG. 14 is a side view of a high RPM magnet-coil pair and a low RPM magnet coil pair positioned parallel to each other along a longitudinal axis of the motor shaft, according to an embodiment of the invention.

Referring first to FIG. 13, therein is shown a side view of an assembled two gear electric motor 1300, having a high RPM magnet-coil pair 1301 and a low RPM magnet-coil pair 1302 fitted within each other on the motor shaft 1350. In contrast, the two gear electric motor 1400 of FIG. 14, has a high RPM magnet-coil pair 1401 and a low RPM magnet-coil pair 1402 positioned approximately parallel along longitudinal axis X of the motor shaft 1451.

Figure 15:
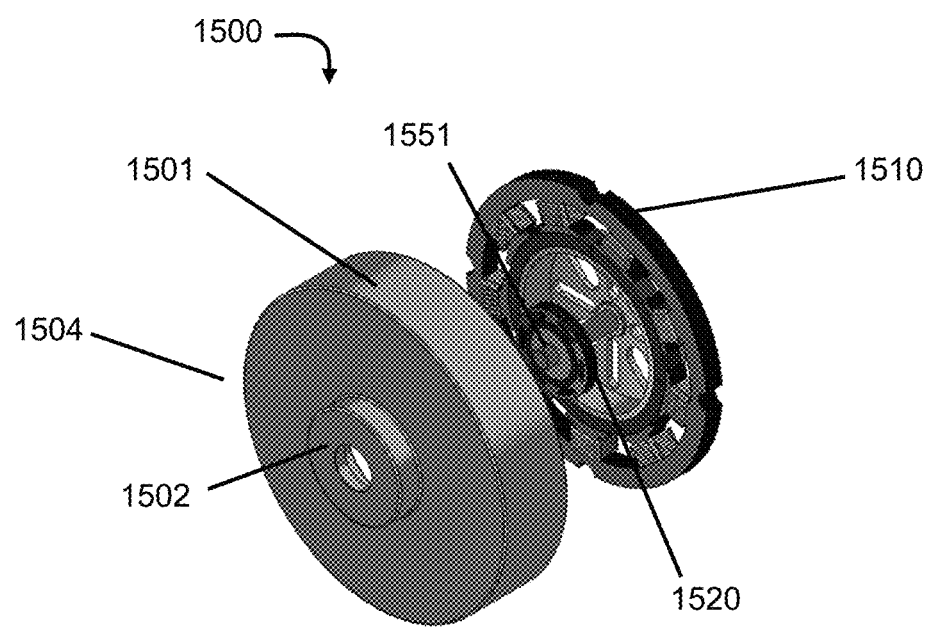
FIG. 15 is a perspective view of the outside and inside of an electric motor having a high RPM gear and a low RPM gear positioned approximately parallel to each other along the motor shaft.

FIG. 15 shows a perspective view of the outside and inside of an electric motor 1500 having a high RPM gear 1520 and a low RPM gear 1510 positioned approximately parallel to each other along the motor shaft 1551, according to an embodiment. In the embodiment of FIG. 15, the motor housing cap 1504 has a "step down" in the diameter, such that the radius of a portion 1502 of the housing cap 1504 that encompasses the high RPM gear 1520, is smaller than the radius of a portion 1501 of the housing cap 1504 that encompasses the low RPM gear 1510. In a three-gear motor where gears are positioned approximately parallel to each other on the motor shaft, the housing cap may comprises two step downs. Similarly, in an electric motor having four or more gears positioned parallel along the motor shaft, the housing cap may comprise three or more step downs. In other embodiments having two or more parallel gears, the motor housing cap may have the same or nearly the same radius through, where the radius of the housing cap is large enough to encompass the largest gear. In other embodiments, the housing cap may, in lieu of having one or more step downs, may be sloped wherein the radius ranges from a radius large enough to encompass the largest gear to a radius large enough to encompass the smallest gear.

Multi-Magnet Type Motor

An alternative embodiment to make more efficient use of electricity at a wider range of speeds and torques is to construct magnet-coils pairs with varying properties. This alternative embodiment takes advantage of multiple coil geometries. Altering the geometries of the coils may yield different magnetic field strengths.

Figure 16A:
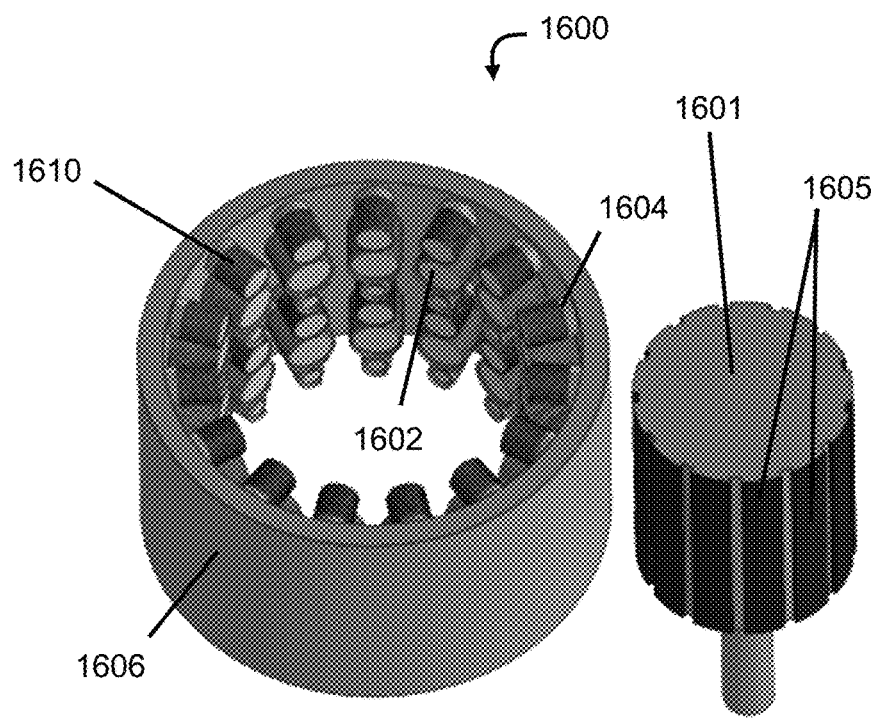
FIG. 16A is a perspective view of a multi-magnet type motor having multiple stator stacks and a plurality of coil properties according to an embodiment if the invention.

FIG. 16A describes an embodiment of a multi-magnet type motor. The rotor 1601 has multiple magnets 1605 with multiple magnet properties. Magnet properties may include:
  Materials used in the magnet; and
  Distribution and shape of the materials.

Figure 16B:
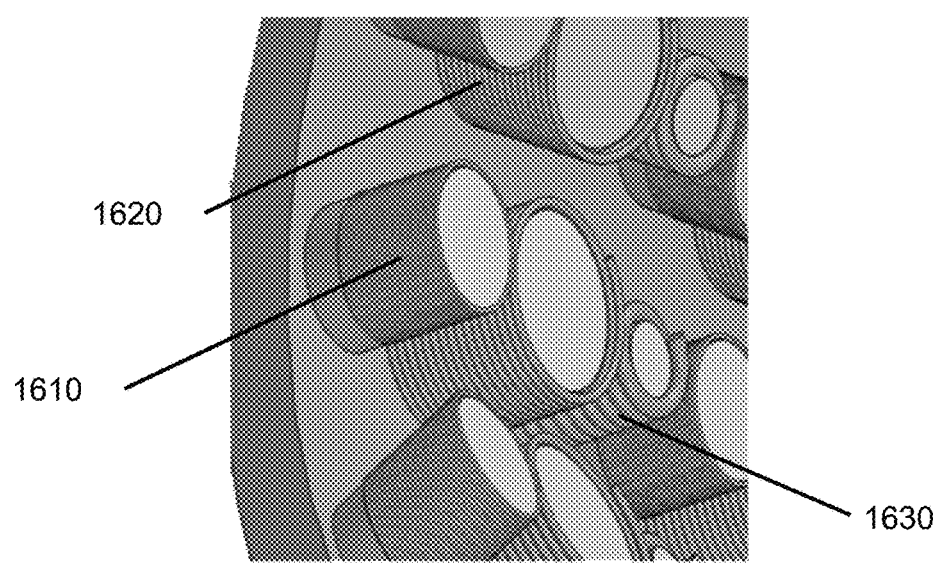
FIG. 16B is an enlarged perspective view of the coils of FIG. 16A showing the plurality of coil properties, including different coil diameters, different wire diameters, different number of turns in a coil, etc.

The stator 1600 comprises stator support material 1606 and multiple stator stacks 1602 with multiple stator spacing material 1604. Multiple coil types 1610, 1620, and 1630 are shown in enlarged perspective view of FIG. 16B. Coil properties may include:
  Number of turns in a coil;
  Thickness of the coil (radius of the wire);
  Materials used for the coil;
  Length of the coil;
  Radius of the turns of the coil; and
  Spacing between the rotor support structure and the beginning of the coil.

Inrunner/outrunner gears for electric motor can be combined with multi-magnet type motor designs to achieve an even more flexible approach to achieve efficiency. The combination of the geometric designs of the magnet/coil pairs of a gear, and the geometric/material design of the coils within a gear generates combinatorial possibilities to achieve a precise level of torque for a given speed, or vice versa.

The GEM motor consists of two parts that distinguish it from traditional brushless motors:
  Multiple gears achieved with multiple rotor-stators, or multiple coil-magnet properties; and
  A controller to determine which current is delivered to the various stator stacks and coils, based on desired velocity and acceleration, and feedback from the motor.

The Controller

Figure 17:
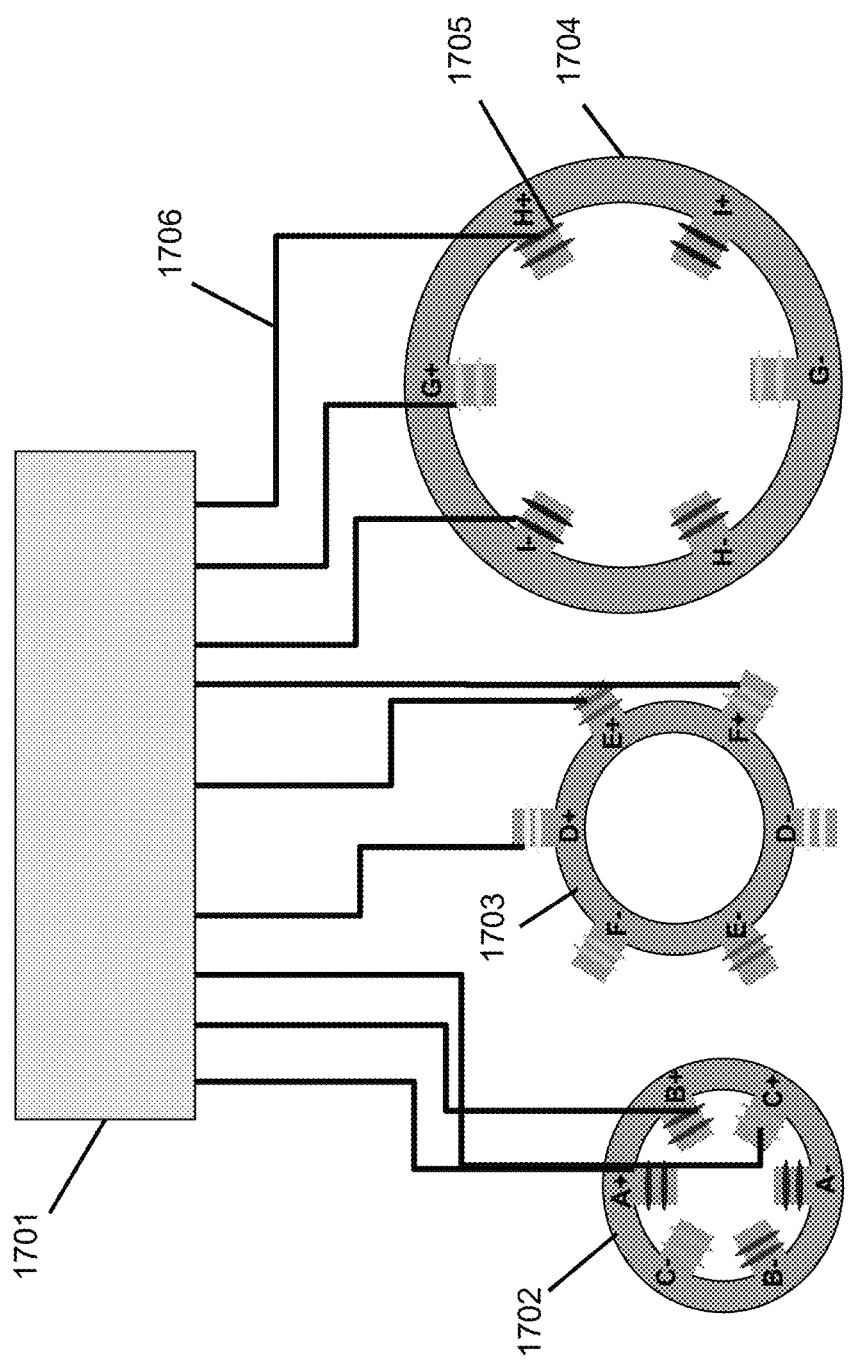
FIG. 17 is a schematic diagram of a controller allocating current to three stators, having three pairs of coils each, according to an embodiment of the invention.

Referring to FIG. 17, the purpose of the motor controller 1701 is to allocate current to the coils of the stators 1702, 1703 and 1704 in an efficient, sequential manner that will generate optimal torque and speed. The controller 1701 has the ability to "excite" or run current through any coil (e.g., coil 1705) at any given time by sending a signal 1706 to a transistor (not shown) which acts as a gate that allows current to pass. Once current is running through a coil (e.g., coil 1705), a magnetic field is generated in accordance with Faraday's law. The controller determines which coils to excite by following a sequence that will cause one or more of corresponding rotors (not shown in FIG. 17) to rotate in the direction desired. Since the rotors are made up of permanent magnets with north and south poles, the controller causes the rotors to rotate by exciting different pair of coils that are opposite to one another in stators 1702, 1703 and 1704, causing the rotors to align themselves with the coils that are excited. The direction of the current in the excited coil determines the orientation of the magnetic field.

Figure 18A:
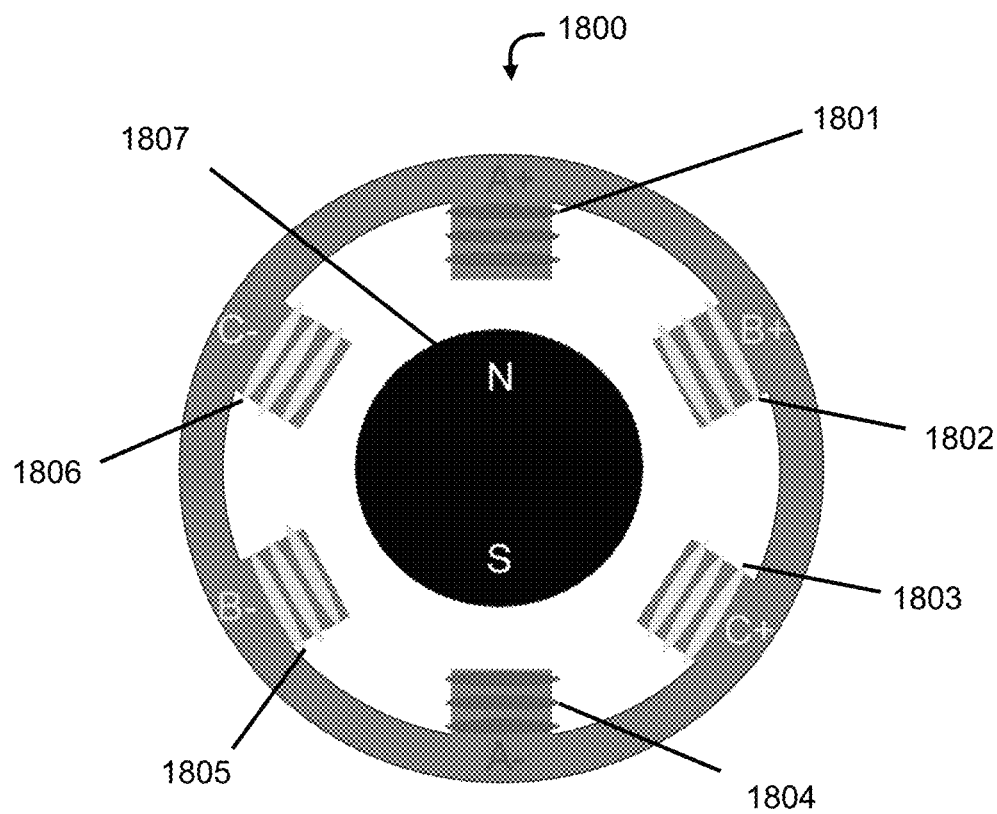
FIG. 18A is a diagram showing a rotor/stator combination having three pairs of coils, according to an embodiment.
Figure 18B:
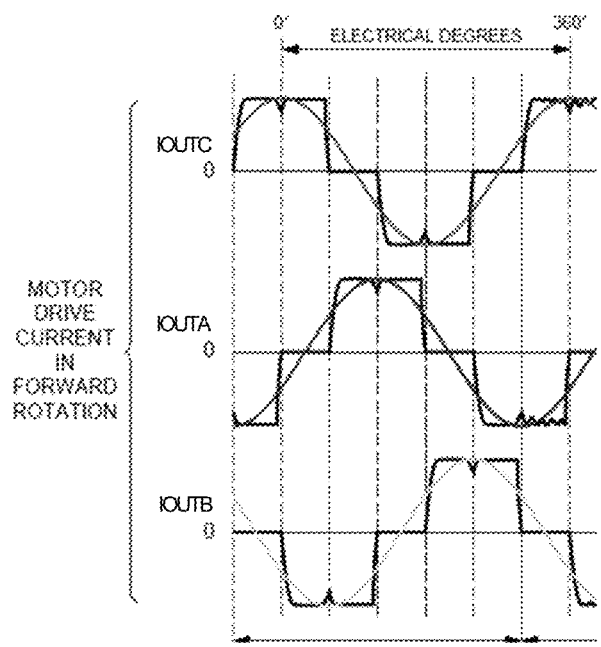
FIG. 18B is a chart of the motor drive current for the three pairs of coils of FIG. 18A.

For example, as FIG. 18A indicates, when coils 1801 and 1804 of stator 1800 are excited (i.e., there is a positive current in one of the coils and a negative current in the other) this causes coils 1801 and 1804 to act as north and south electromagnets, which in turn causes the rotor 1807 to align its permanent magnets with the electromagnets. In order to have continuous rotation of the rotor 1807, the pairs of coils need to be excited in a sequence (1801 and 1804), (1802 and 1805), and (1803 and 1806) such that the rotor is always rotating in the same direction to align itself with the newly energized coils. This sequence is shown in the graph of FIG. 18B detailing the value (positive, zero, or negative) of the current (I out) in any coil at a given position of the rotor. In a three-gear embodiment having three stators, the multi-gear motor creates at least nine phases in comparison with a single-phase for conventional motors. This is shown in FIG. 17 where the three stators 1702, 1703 and 1704 each have three pairs of coils, thus nine pairs total.

This particular sequence is called a three-phase sequence because there are three pairs of coils. This means that at any given time, one pair of coils has a certain current running through it, while the other coils might be energized differently or not energized at all. Each coil pair has an equal yet opposite current running through it; for instance, there might be a clockwise running current i through coil 1801, so naturally there would be a counterclockwise running current −i through coil 1804.

The disadvantage of existing electric motors is that only one magnitude of current can be allocated to the stator at any given time, which means the motor can only achieve one level of torque. This is not ideal in dynamic applications that might require different torques at different times. In the embodiment of FIG. 17, three different stators 1702, 1703, and 1704 are optimized for three different levels of torque, and the sophisticated controller 1701 allocates different levels of current to each of these stators 1702, 1703 and 1704, thereby generating different torques for different scenarios.

The windings in stator 1702 have lower inductance optimized for high RPMs, while those in stators 1703 and 1704 represent, respectively, the medium and high inductance portion of the motor optimized for medium and low RPMs and medium and high torque. The controller 1701 is optimized for higher current flow. Derivative block to feedback velocity information is utilized to determine power optimization for a given speed.

Figure 19:
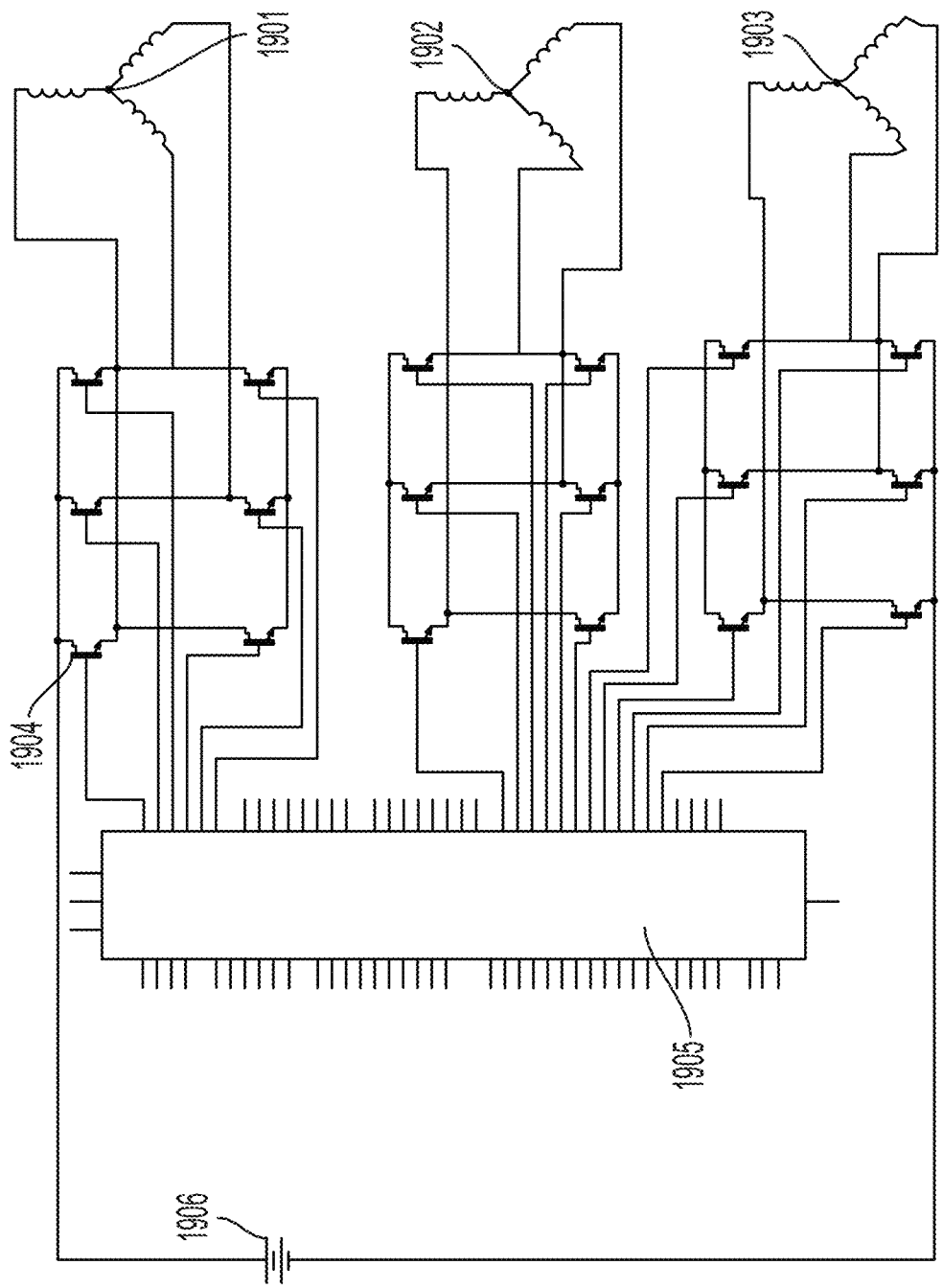
FIG. 19 is a circuit diagram for a three-gear electric motor according to an embodiment.

FIG. 19 shows a detailed circuit diagram of the three rotor embodiment of FIG. 17. There are three stators 1901, 1902, and 1903 with three phases each. The controller sends a signal to any pair of transistors 1904, which allows current from the battery 1906 to flow to the corresponding stator coil. Each gear has transistors that are rated for different voltages; therefore, the signal from the controller 1905 will cause a different current magnitude to run through each stator. For example, if the transistors in stator 1901 are rated for 24V, then the signal from the controller 1905 will cause a certain current to run through stator 1901, for example, 24 mA. If the transistors 1904 in stator 1902 are rated for 12V, then the signal from the controller 1905 will cause a smaller current to run through stator 1902, for example, 12 mA. This allows the motor as a whole to achieve different torques since the controller controls how much current is going to each stator.

The foregoing descriptions of specific embodiments of the present invention have been presented for purposes of illustration and description. They are not intended to be exhaustive or to limit the invention to the precise forms disclosed. Obviously, many modifications and variations are possible in light of the above teaching. The embodiments were chosen and described in order to best explain the principles of the invention and its practical application, to thereby enable others skilled in the art to best utilize the invention and the various embodiments and modifications as are suited to the particular use contemplated. It is intended that the scope of the invention be defined by the components and elements described herein and their equivalents.

What is claimed is:

1. An electric motor comprising
a motor shaft;
a rotor assembly comprising:
- a plurality of concentric rotors operably attached to the motor shaft, each concentric rotor having a plurality of permanent magnets;
- at least some of the plurality of permanent magnets having different magnetic properties;

a stator assembly comprising:
- a plurality of concentric stators, each concentric stator having a plurality of pairs of stator coils;
- at least some of the plurality of stator coils having different coil properties;
- wherein a radius of a first concentric stator is different than a radius of a second concentric stator; and a controller allocating electrical current to the plurality of pairs of stator coils, thereby causing rotation of the motor shaft.

2. The electric motor of claim 1, wherein the rotor assembly comprises a combination of inrunner and outrunner rotors, and the stator assembly comprises a combination of inrunner and outrunner stators.

3. The electric motor of claim 2, wherein each of the inrunner rotors has a corresponding inrunner stator, and each of the outrunner rotors has a corresponding outrunner stator, and adjacent rotors alternate between inrunner and outrunner.

4. The electric motor of claim 1, wherein the radius of the first concentric stator is smaller than the radius of the second concentric stator.

5. The electric motor of claim 4, wherein a radius of a third concentric stator is larger than the radius of the first concentric stator and smaller than the radius of the second stator.

6. The electric motor of claim 1, wherein the motor is a brushless motor.

7. The electric motor of claim 1, wherein the controller optimizes power for a given RPM.

8. An electric motor, comprising:
a motor shaft;
a high magnet-coil pair, comprising:
- a high revolutions per minute (RPM) rotor operably coupled to the motor shaft; and
- a high RPM stator stack; and a low magnet-coil pair, comprising:
- a low RPM rotor operably coupled to the motor shaft; and
- a low RPM stator stack;
- the high magnet-coil pair and the low magnet-coil pair having different magnetic and coil properties;
- a controller allocating electrical current to at least one of the high RPM stator stack and the low RPM stator stack based on a desired torque and RPM of the motor shaft.

9. The electric motor of claim 8, wherein the high RPM stator stack is an inrunner stack and corresponds to inrunner poles of the high RPM rotor, and the low RPM stator stack is an outrunner stack and corresponds to outrunner poles of the low RPM rotor.

10. The electric motor of claim 8, wherein the high RPM stator stack is an inrunner stack and corresponds to inrunner poles of the high RPM rotor, and the low RPM stator stack is an inrunner stack and corresponds to inrunner poles of the low RPM rotor.

11. The electric motor of claim 8, wherein the high RPM stator stack is an outrunner stack and corresponds to outrunner poles of the high RPM rotor, and the low RPM stator stack is an inrunner stack and corresponds to inrunner poles of the low RPM rotor.

12. The electric motor of claim 8, wherein the high RPM stator stack is an outrunner stack and corresponds to outrunner poles of the high RPM rotor, and the low RPM stator stack is an outrunner stack and corresponds to outrunner poles of the low RPM rotor.

13. The electric motor of claim 8, further comprising:
a medium magnet-coil pair comprising:
- a medium RPM rotor; and
- a medium RPM stator stack.

14. The electric motor of claim 8, wherein the controller optimizes power for a given RPM.

15. The electric motor of claim 8, wherein the electric motor is a brushless motor.

16. The electric motor of claim 8, wherein the high magnet-coil pair and the low magnet-coil pair are fitted within each other.

17. The electric motor of claim 8, wherein the high RPM magnet-coil pair and the low RPM magnet-coil pair are positioned approximately parallel to each other along a longitudinal axis of the motor shaft.

18. An electric motor, comprising:
a motor shaft;
a rotor assembly comprising:
- a plurality of permanent magnets, at least some of the plurality of permanent magnets having different magnetic properties;

a stator assembly comprising:
- a plurality of stators, each of the plurality of stators having pairs of stator coils, at least some of the plurality of stator coils having different coil properties;

a controller allocating electrical current to one or more of the pairs of stator coils to rotate the motor shaft.

19. The electric motor of claim 18, wherein the different magnetic properties are determined by one or more of materials used in the permanent magnets, a shape of the magnets, and distribution of the magnets.

20. The electric motor of claim 18, wherein the different coil properties are determined by geometries of the coils, wherein the geometries of the coils comprise one or more of a number of turns in the coils; a thickness of the coils; a diameter of a wire used in the coils; materials used for the coils; a length of the coils; a radius of turns of the coils; and a spacing between rotor support structures and the coils.

* * * * *